United States Patent [19]

Scherk et al.

[11] Patent Number: 5,068,888
[45] Date of Patent: Nov. 26, 1991

[54] INTERACTIVE FACSIMILE INFORMATION RETRIEVAL SYSTEM AND METHOD

[75] Inventors: Randall P. Scherk; Daniel J. Steneker, both of Richmond, Canada

[73] Assignee: AFD Systems, Inc., Richmond, Canada

[21] Appl. No.: 393,482

[22] Filed: Aug. 11, 1989

[51] Int. Cl.$^5$ .................... H04M 11/00; H04N 1/32
[52] U.S. Cl. .................... 379/100; 379/88; 379/95; 379/96; 358/402; 358/403; 358/407; 358/435
[58] Field of Search .................... 379/88–98, 379/189, 196–198, 100, 200, 95; 358/402, 403, 405, 407, 434–436, 438, 440, 442, 443, 468

[56] References Cited

U.S. PATENT DOCUMENTS

| | | | |
|---|---|---|---|
| 4,559,415 | 12/1985 | Bernard et al. | 379/95 |
| 4,646,160 | 2/1987 | Iizuka et al. | 379/92 |
| 4,792,849 | 12/1988 | McCalley et al. | 379/96 |
| 4,794,642 | 12/1988 | Arbabzadah et al. | 379/200 |
| 4,866,758 | 9/1989 | Heinzelmann | 379/94 |
| 4,866,762 | 9/1989 | Pintar | 379/200 |
| 4,893,333 | 1/1990 | Baran et al. | 379/100 |
| 4,918,722 | 4/1990 | Duehren et al. | 379/100 |
| 4,974,254 | 11/1990 | Perrine et al. | 379/100 |
| 4,994,926 | 2/1991 | Gordon et al. | 379/100 |

FOREIGN PATENT DOCUMENTS

| | | | |
|---|---|---|---|
| 0126758 | 6/1987 | Japan | 379/95 |
| 0158868 | 6/1989 | Japan | 379/100 |
| 2211698 | 7/1989 | United Kingdom | 379/100 |

OTHER PUBLICATIONS

Anonymous, "Document Distribution System", *International Technology Disclosures*, vol. 6 No. 5, May 1988, p. 2.

J. Smith, "Preventing Computer Crime: There are no easy answers", Telephony, Jun. 13, 1983, pp. 22,23,27.

Y. Ozawa et al., "Voice Response System and its Applications", *Hitachi Review*, vol. 28, No. 6, 1979, pp. 301–305.

R. J. Perdue et al., "Conversant ® 1 Voice Response System", AT&T Technical Journal, Sep./Oct. 1986, vol. 65, No. 5, pp. 34–47.

*Primary Examiner*—James L. Dwyer
*Assistant Examiner*—Wing F. Chan
*Attorney, Agent, or Firm*—Flehr, Hohbach, Test, Albritton & Herbert

[57] ABSTRACT

An information delivery system automatically delivers documents from a central information storage location to a facsimile machine positioned at a remote location in response to user requests that are automatically answered by the system. The information delivery system includes an extended memory for digitally storing image files of documents. A request processing module is arranged to automatically receive telephone requests for specific stored documents. The request module provides signals to prompt the caller to input the information necessary to deliver the selected documents. The order information includes at least an identification code for the documents selected for delivery and a telephone number designated for the user's facsimile machine. At least one facsimile delivery module is provided to automatically deliver the selected documents to the facsimile machine designated by the user.

24 Claims, 8 Drawing Sheets

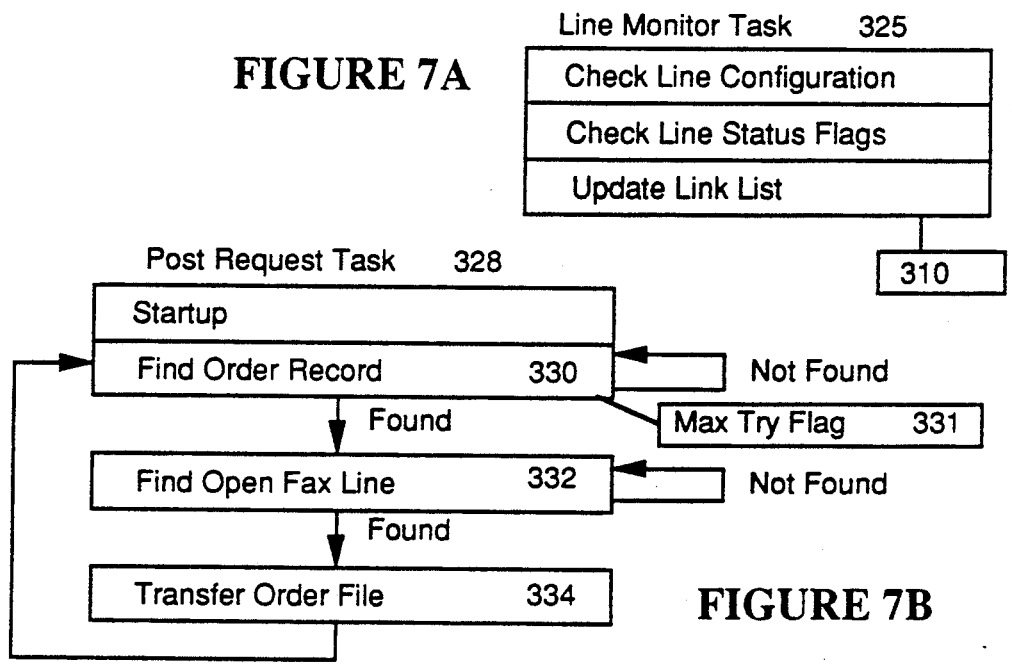
FIGURE 7A
FIGURE 7B
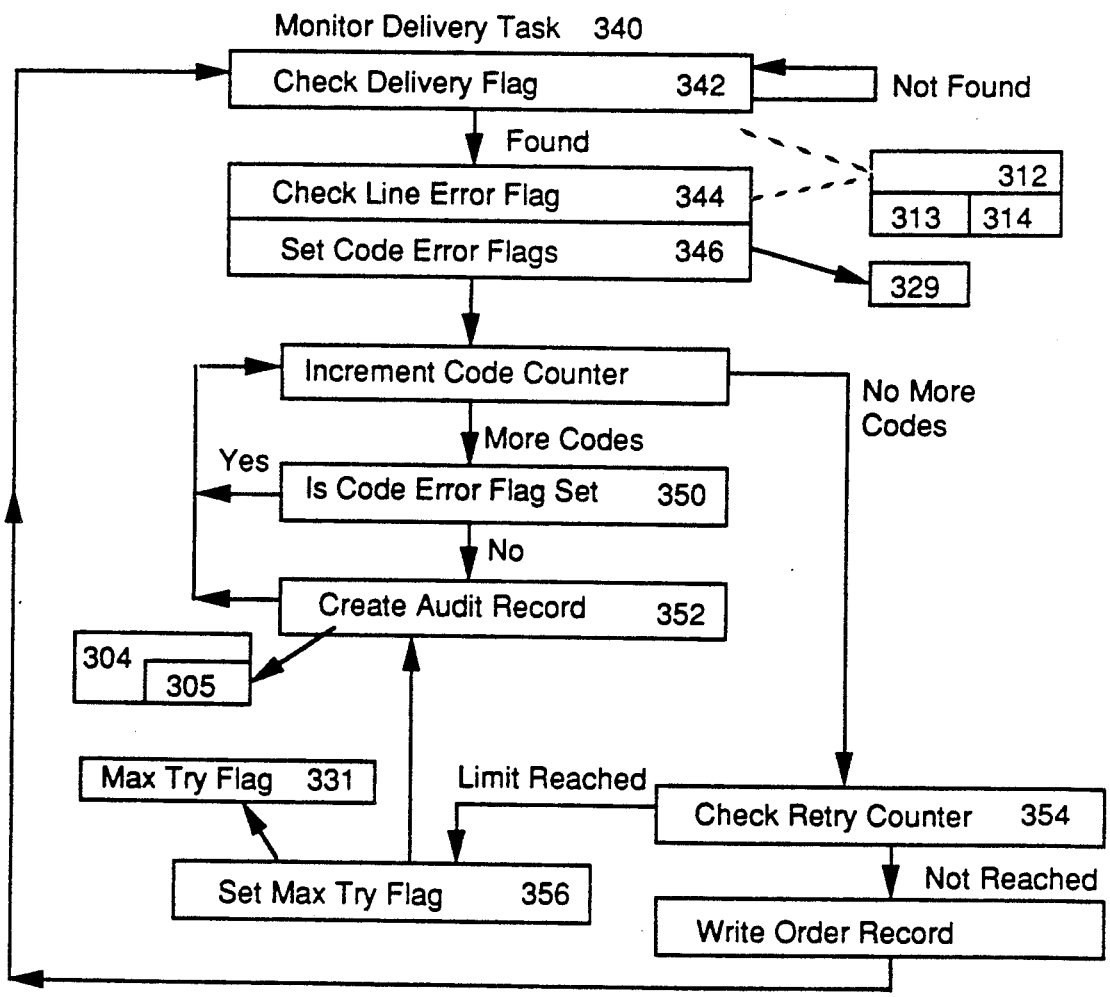
FIGURE 8

Client Information Record 113

| 170 | 171 | 172 | 174 | 175 | 176 |     |     |
|-----|-----|-----|-----|-----|-----|-----|-----|
|     | 434 | 435 | 436 | 437 | 438 | 439 |     |
|     | 180 | 181 | 182 | 183 | 184 | 185 | 186 | 189 |
|     | 190 | 191 | 192 |     |     |     |     |     |

Information Code Record 108

| 110 | 170 | 193 | 194 | 195 | 196 | 197 | 198 | 199 |
|-----|-----|-----|-----|-----|-----|-----|-----|-----|
|     | 275 | 278 | 279 |     |     |     |     |     |
|     | 281 | 282 | 283 | 284 | 286 | 289 | 290 | 291 |
|     | 295 | 296 | 297 | 299 |     |     |     |     |
|     | 210 | 211 | 212 |     |     |     |     |     |

Request Record 90

| 170 | 500 | 502 | 504 | 505 | 507 | 509 | 510 |
|-----|-----|-----|-----|-----|-----|-----|-----|
|     | 530 | 532 | 534 | 536 |     |     |     |
|     | 110 | 520 | 526 |     |     |     |     |
|     | 110 | 520 | 526 |     |     |     |     |
|     | 110 | 520 | 526 |     |     |     |     |
|     | 110 | 520 | 526 |     |     |     |     |

Audit Record 305

| 110 | 170 | 540 | 541 | 542 | 544 | 545 |
|-----|-----|-----|-----|-----|-----|-----|
|     | 502 | 509 | 510 | 548 | 549 | 550 |

FIGURE 9

INTERACTIVE FACSIMILE INFORMATION RETRIEVAL SYSTEM AND METHOD

The present invention relates generally to an improved information distribution system. More particularly, a remotely operated system is described which permits users to request the delivery of information to a designated location. The preferred embodiment described utilizes facsimile machines to deliver the information.

BACKGROUND OF THE INVENTION

Recent improvements in information transferring technology have created a wide variety of mechanisms capable of immediately transferring information between remote locations. Accordingly, it is desirable to utilize such technologies to provide potential customers, clients or other interested parties with virtually immediate access to information in a readily usable form. The information itself may take any form including advertisements, data sheets, notices, etc. In the past, telephone operators and support staff have typically been required to receive the information requests. The requested advertisement or other information is then manually placed in an envelope and mailed to the requesting party or manually faxed to the customer. Unfortunately such a process relies on manual labor and the customer often doesn't receive the desired information for several days. In operations which receive a large volume of information requests, the labor costs can be relatively high. In smaller volume operations, valuable worker time is spent doing these relatively simple, yet critical tasks. Therefore, there is a need for an automated information delivery system which can take advantage of the increased popularity of facsimile machines and the like to rapidly transfer desired information to a requesting party, without requiring the attention of the sending party's staff.

SUMMARY OF THE INVENTION

Accordingly, it is a primary objective of the present invention to provide an information delivery system capable of automatically and rapidly sending requested information to remote locations.

Another objective is to provide an information delivery system which automatically receives telephone requests for information and delivers the information to a location designated by the caller using facsimile (fax) machines or the like.

To achieve the foregoing and other objects of the present invention, an information delivery system is provided which automatically delivers documents from a central information storage module to a facsimile machine positioned at a remote location in response to user requests that are automatically answered by the system. The information delivery system includes a storage module for digitally storing image files of documents. A request processing module is arranged to automatically receive telephone requests for specific libraried documents. The request module provides signals to prompt the caller to input the information necessary to deliver the selected documents. The order information includes at least an identification code for the documents selected for delivery and/or a telephone number designated for the user's facsimile machine. At least one fax delivery module is provided to automatically deliver the selected documents to the facsimile machine designated by the user.

In a preferred embodiment, the fax delivery module includes a plurality of independent fax lines each being capable of independently faxing selected documents to different remote facsimile machines. A fax controller receives the order information and orchestrates the simultaneous delivery of independent orders. The request module includes a digitized voice file which stores a multiplicity of digitized voice signals suitable for prompting a caller to provide the required order information. A plurality of voice lines are provided to receive incoming telephone calls. Each voice line has an associated speech generator for translating the digitized voice signals into audible prompt signals for the caller. The request module also includes a request controller that directs the issuance of suitable voice prompts to the caller to solicit the necessary order information.

The request controller is preferably arranged to validate the information provided by the users and to verify that the user is authorized to access the requested documents. One of the validation steps involves checking the designated fax number against an abused number file which lists a variety of telephone numbers that should never be called. The system is also arranged to permit the owners of the documents wide latitude in regulating who may access their documents. Specifically, the document owners may require users to enter User ID numbers, passwords, confirmation numbers and the like.

In the preferred embodiment, a scheduling module is provided for storing the request records waiting for delivery as well as organizing the order in which the requests are transmitted. The request module, scheduling module, storage module and fax delivery module are each separate modules that communicate with one another over a local area network.

BRIEF DESCRIPTION OF THE DRAWINGS

The features of the present invention that are believed to be novel are set forth with particularity in the appended claims. The invention, together with further objects and advantages thereof, may best be understood by reference to the following description taken in conjunction with the accompanying drawings in which:

FIGS. 7A, 7B and 8 are flow diagrams of the scheduler controller tasks for an embodiment of the scheduler module.

FIG. 9 is a block diagram of several of the records used at various locations within the system.

DETAILED DESCRIPTION OF THE PREFERRED EMBODIMENTS

Figure 1:
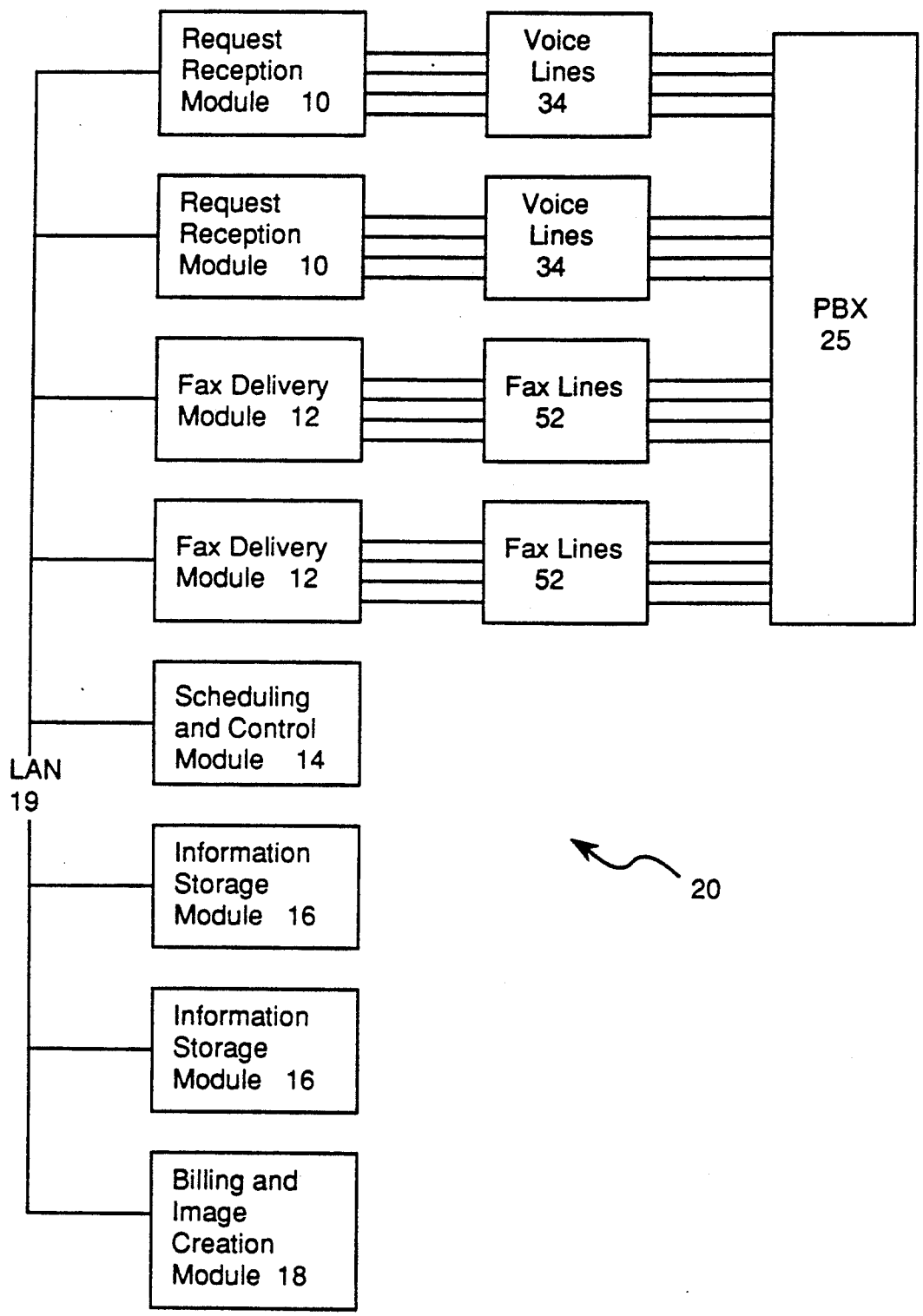
FIG. 1 is a block diagram of an automated fax delivery system in accordance with the present invention.

As illustrated in the drawings, the present invention seeks to provide an information distribution system which allows users to request the delivery of information (such as advertisements, notices, product data sheets and the like) from a remote information library and to have that information delivered to the user in short order via facsimile (fax) machines or the like. In the embodiment of the invention chosen for the purposes of illustration, "clients" are the owners of documents that are stored in the system's library, and "users" are persons who call up and request that copies of specified documents be sent to their fax machines.

For the purposes of this description, a facsimile machine is defined to be a mechanism for transferring images over telephone lines, including eletronic circuits and systems used in conjunction with computers that can send and/or receive facsimile images. Thus the term "facsimile machine" includes not only currently available facsimile machines, but also other image transmission and receiving devices that may be used or developed in the future.

A storage module (also called the central library) is provided which stores information (i.e., documents) in the form of digital images for a wide variety of clients. The stored documents may include figures, text or any combination of the two. Users interested in receiving documents from the clients call the library facility and request the desired documents in response to prompts generated by the system. The prompts may either take the form of voice prompts or display prompts on a computer screen. In the voice prompted mode, the user inputs the request using touch tone (i.e., DTMF) phone signals. Once the user has completed the information request, the system locates the requested information and faxes the information to a fax machine designated by the requester. In an alternate embodiment that may be used in the future, a voice recognition unit may be used to receive order information from users.

Referring initially to FIG. 1, a preferred embodiment of the information distribution system 20 chosen for the purposes of illustration includes a multiplicity of functional modules which communicate with one another over a local area network (LAN) 19. The modules are each organized to independently perform specific tasks. When a specific module completes a particular task or requires additional information, it communicates with the appropriate one of the other modules over the LAN 19. The modules include at least one request reception module 10 (sometimes called the request module), at least one information delivery module 12, a control and scheduling module 14, at least one digital information storage unit 16 (collectively called "the library") and a billing and image creation module 18 (sometimes called the billing module).

Each request reception module 10 is coupled to a set of incoming telephone lines by a set of voice lines 34 and a PBX 25 or equivalent telephone line switching system. Each fax delivery module 12 is coupled to a set of outgoing telephone lines by a set of fax lines 52 and the PBX 25. The billing and image creation module 18 includes a subsystem for scanning documents and creating image files.

The information storage module 16 contains a high capacity hard disk that is used to store documents in the form of image files.

As will be apparent from the description below, the modular architecture of the system allows additional request modules 10, fax delivery modules units 12 and information storage modules 16 to be readily added to the information distribution system 20 as the volume demand on the system grows. Each of the modules has a controller which may take the form of a personal computer such as an IBM PC/AT.

In the preferred embodiment, several different clients provide information to be disseminated through the system. The clients, as opposed to the users, are billed for the costs associated with delivering the requested documents. Accordingly, the system is designed to provide the clients with a great deal of flexibility in controlling the dissemination of their information. However, it should be appreciated that although the system is described in terms of a central library that stores documents for a number of clients, the system could readily be arranged to accommodate the needs of a single organization such as a large corporation or a governmental department wherein the available information is provided as a free service, thereby eliminating the need for recording extensive billing information. Alternatively, the system could be arranged such that the users are billed directly as opposed to the information providers.

There are two preferred embodiments of the request reception module 10. A first type request reception module 10 is a voice module adapted to speak voice prompts to users which will input the necessary order information into the system using the touch tone feature of their telephones. A second type of request reception module 10 is a dial-in module which generates digital prompts suitable for use by computer terminals.

Figure 2:
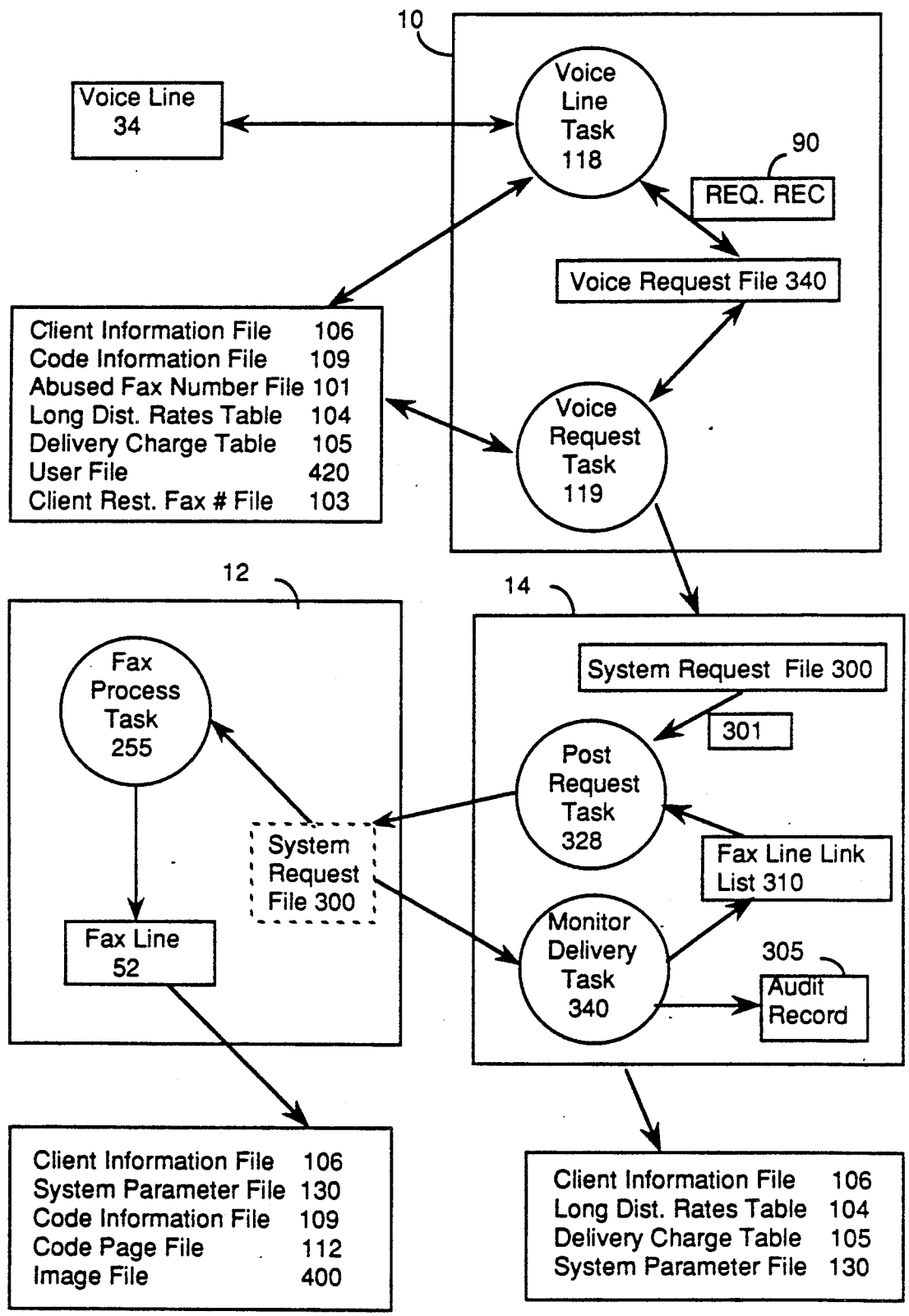
FIG. 2 is a data flow diagram of a fax delivery system having a single input channel and a single output channel.
Figure 3:
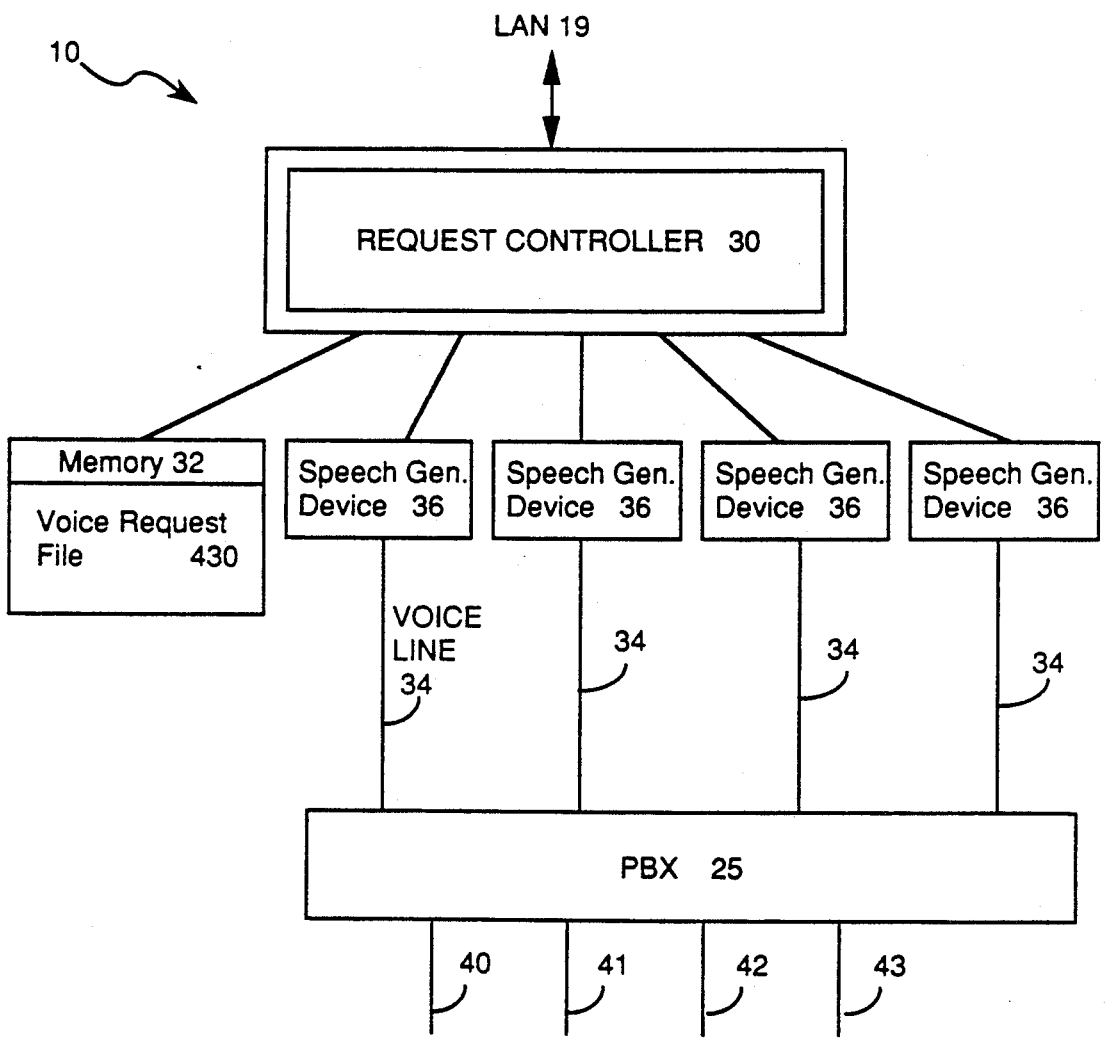
FIG. 3 is a block diagram of a request reception module in accordance with the present invention.

Referring next to FIGS. 2 and 3, the following description is an overview of the information distribution system 20. Calls are received over voice lines 34 by the request module 10. A Voice Line task 118, executed by a request controller 30 in the request reception module 10, solicits the necessary order information and creates a request record 90 that reflects the order information received. The request record 90 is stored in a voice request file 340. Referring briefly to FIG. 9, the request record 90 includes at a minimum, an identification of the information codes 110 corresponding to the documents requested, an identification of the client 170 for billing purposes and a designated fax number 502 to which the information should be sent.

Referring once again to FIG. 2, the Voice Line task 118 also validates the request by making s::re the user is authorized to receive the selected information and that the designated fax number is legitimate.

Once the request record has been created, a Voice Request task 119 transfers the request record 90 to a system request file 300 in the control and scheduling module 14 (also called the scheduling module), wherein the record is stored as an order record 301. The scheduling module 14 looks for an open fax line 52 through the execution of a monitor delivery task 340. When an available fax line is found, the scheduling module 14 transmits the order record to the associated fax delivery module 12 and then image files 400 (which carry the various documents libraried within the system) corresponding to the requested information codes are transmitted to the user. The order records 301 are transferred from the scheduling module 14 to the fax delivery module 12 through the use of a Post Request task 328 executed by the scheduling module's controller. The actual transmission of the requested image files is carried out by a Fax Process task 255 executed by the fax module 12. When the delivery is completed, the Fax Process task 255 creates a record which indicates the documents delivered and the amount of time that a telephone connection was required to deliver the documents. The Monitor Delivery task 340 then creates an audit record 305 which is stored within the control and scheduler module 14 until the appropriate billing cycle occurs and the bills are created by the billing module 18. Once the delivery is completed, the Monitor Delivery task 340 detects that the line is free and causes the next order record 301 to be transferred to the fax module 12 for delivery.

Billing works generally as follows. For each user there is are two credit limit parameters: one for long distnace telephone charges and one for total charges. Similarly there are two overdrawn account flags, one for telephone charges and one for total charges, each of which is set when the client's credit limit has teen exhausted. When a user requests delivery of one or documents from a particular client, the request module 10 first checks the overdrawn account flags for the client to see if the client has exhausted his credit. If not, the request module 10 allows the requested document to be delivered. It also computes an estimated charge, and sets one or both of the overdrawn account flags if either credit is exceeded by the estimated charges so as to prevent the delivery of any additional documents belonging to the client. Next, when the fax delivery module 12 completes delivery of the requested documents, it records an accurate representation of the amount of time that a telephone connection was required to deliver the documents. Finally, the control and scheduling module 14 determines the actual charges of delivery the requested documents to the user, based on the delivery time and other factors, and then adds these amounts to the client's total accumulated charges.

To accommodate the billing and user validation functions, there are several system files which are provided to facilitate efficient use of the system and to prevent user abuse. These system files are frequently used by more than one of the modules and are located in either the control and scheduling module 14 or the storage module 16. The system files include an abused phone number file 101 that contains a list of abused phone numbers which should never be called. This list includes such numbers as emergency, fire and police departments. Similarly, client specific restricted number files are provided that allow clients to restrict the numbers to which their information is provided. The client restricted number files 103 may take either the form of a list of permitted numbers (such as specific customers) or a list of numbers that are not permitted (such as competitors).

A long distance rates table 104 is provided which is used to compute the charges billed to clients for long distance telephone connections. The long distance rates table 104 may either duplicate the long distance telephone carrier's rates schedules or may include surcharges to reimburse the system's custodian for handling the payment of telephone charges. Similarly, a delivery charge table 105 is provided which indicates the rates charged for delivering each particular document stored in the system.

A client information file 106 contains a record for each client of the system and has fields that indicate any special features required by the client as well as the basic information necessary for billing and communication purposes. Referring to FIG. 9, each record 113 in the client information file 106 includes all of the information that relevant to a specific client. In the described embodiment, the client information record 113 includes the client ID number 170, the client's name and address 171, the client's fax number 172 for bill delivery, an abbreviated client name 174 for displays or printing in small areas, the contact person's name and phone number 175, and a status flag 176 indicating whether the client is active (i.e., its information codes can be requested) or inactive.

There is a unique code associated with every deliverable document stored in the information storage modules 16. In the following description the terms "code" and "document" are used interchangeably.

The client information file 106 also has a large number of flags to indicate whether specific information is required for the particular information request that has been entered. These flags include a User ID flag 180 which indicates whether the user must provide an User ID to get documents belonging to the client. A password flag 181 indicates whether users must enter a password 192 in order to access documents belonging to the client. A phone flag 182 indicates whether the user should be prompted to enter its phone number. A long distance status flag 183 indicates whether the code can be delivered long distance. An international flag 184 indicates whether international long distance calls are permitted. A multiplicity flag 185 indicates whether multiple code requests are permitted during a single session.

A same code flag 186 indicates whether a code can be requested by the same fax number more than once during in a preset number of days. If so, a limit on the number of times is denoted as a specified number cf times per a specified number of days. A delivery mode flag 189 indicates whether the user may designate &:he priority of the request and a high priority field 190 is provided to indicate the highest priority which a user may designate for the requested information code. A default priority field 191 indicates the default priority which is assigned to the requested code in the event that the user does not indicate a priority. It should be appreciated that the various user identification checks set forth above are by way of example only and that the system may be configured to ask for any information desired by the clients, including billing information.

Each client record 113 also includes several fields relating to the clients credit limits. An accumulated charges field 434 denotes the total charges incurred by the client since the last bill was generated. A long distance field 435 denotes the long distance charges incurred since the last bill was generated. A credit limit field 436 indicates the total charges that the client is allowed to incur. A (long distance) telephone credit limit field 437 specifies the maximum long distance charges that are allowed, if the client wishes to distinguish between total charge limits and long distance charge limits. A credit status flag 438 indicates whether the client has sufficient credit to allow the delivery of additional information codes. Finally a telephone credit status flag 439 indicates whether the client's telephone credit limit has been exceeded.

Note that the total charges for delivering a document comprise a delivery fee charged once per document, plus a charge for making a telephone connection to the user. In addition, clients are periodically charged storage fees for storing image files on the system.

Each document libraried within the system has a designated information code 110 which uniquely identifies the document. Thus, a code information file 109 is provided which contains a record 108 for each of the information codes. The code information records 108 contain all the information that is specific to a particular code and includes an indication of the length of the associated documents (specified as a number of pages and a number of kilobytes of storage space) and any information that is required by the client beyond the previously discussed general client restrictions that is necessary for validating the delivery of the particular code.

In the preferred embodiment, each information code record 108 includes fields for the information code 110, the client ID number 170 for the client that owns the code, a table of keywords 193 that describe the document (used in search and scan functions for computer dial-in modules), a short description of the document 194, an indication of the number of pages 195 that are delivered With the code, the size of the document in kilobytes 196, a charge table reference 197 indicating the location in a delivery charge table 105 that indicates the delivery charge associated with transmitting the particular code, and an access field 198 indicating the restricted fax number file 103 that is associated with the code. An expiration date field 199 indicates a time and date after which the code should not be delivered.

The flags include a status flag 275 which indicates whether the code is active. A system activity flag 278 indicates whether the code is active for requests. If the code is being updated, the system activity flag 278 will be set to inactive. A User ID flag 279 which indicates whether delivery of the code is restricted to specific User ID's. Additional flags include a password flag 281, a phone flag 282, a long distance flag 283, an international flag 284, a same code flag 286, a delivery mode flag 289, a high priority field 290 and a default priority field 291 each function identically with those discussed in reference to the client information file 106 but allow the client to alter the various requirements by document instead of as a whole.

Several fields are also provided which allow remote computers using modem connections to interrogate the information code records 108 using keyword searches. These include a scan password flag 295 that indicates whether a password is required to scan the particular code. A password field 296 indicates the required password. A list flag 297 indicates when a record has been identified in a keyword search, and a scan keyword flag 299 indicates whether a scan is permitted to detect the code's keywords.

Referring to FIG. 2, image files 400 are provided which contain the actual documents, with a separate file being provided for each page of the documents. A code/page file 112 (which could be incorporated into the code information file 109) indicates the actual image files 400 which correspond to each information code. Specifically, each record includes the information code 110, an indication of the sequence of page records within the image files 400 which constitute the document referenced by the information code and the page number of the documents each page record refers to.

Referring next to FIG. 3, the organization of a request reception module 10 is as follows. The request reception module 10 is arranged to communicate with users to obtain the order information needed by the fax delivery system to order specific images libraried within the system. The request controller 30 is responsible for verifying the legitimacy of the request as well. To this end, the request controller executes numerous tasks to prompt the user to input the required order information such as the desired information codes 110 for the messages sought; the priority of the request 190; a designated fax number 502 to which the desired messages can be sent; a contact phone number at which the user can be contacted; and specific user identification marks such as passwords and the like. Once the necessary order information has been solicited and checked for its propriety, a request record 90 indicating the required order information is created and transferred to the control and scheduling module 14 which dictates the delivery of the requested documents. The request reception module 10 described in detail below contemplates a system wherein a user calls in and receives voice prompts. The user then inputs to the system using touch tone phone signals. However, a functionally identical system could readily be fabricated which utilizes computer prompts transmitted through modems as opposed to voice prompts.

As seen in FIG. 3, the request reception module 10 includes a request controller 30, memory 32 that is randomly accessible by the request controller 30, and one to eight voice lines 34 each having an associated digital speech generator device 36. Each of the voice lines 34 is arranged to be coupled to external phone lines though a PBX 25 or other telephone switching arrangement. In a preferred embodiment, the controller 30 is implemented using an IBM PC/AT having a 40 megabyte hard drive as well as random access memory. A LANTASTIC LAN adapter is provided to couple the request module 10 to LAN 19. The request module's hard disk stores a wide variety of digitized voice phrases which are converted into synthesized speech by the speech generator devices 36. In an alternate embodiment, phrases to be "spoken" could be stored as standard character strings, and a text-to-speech synthesizer could be used to convert the character strings into spoken prompts.

The request controller 30 executes a multiplicity of tasks to perform its functions. Initially, the request controller executes a startup procedure which physically boots the system, loads the appropriate communications software and performs various security and diagnostic checks. The other operational tasks are then executed. The operational tasks include a plurality of Voice Line tasks 118. A dedicated Voice Line task is provided for each of the voice lines 34.

Figure 4:
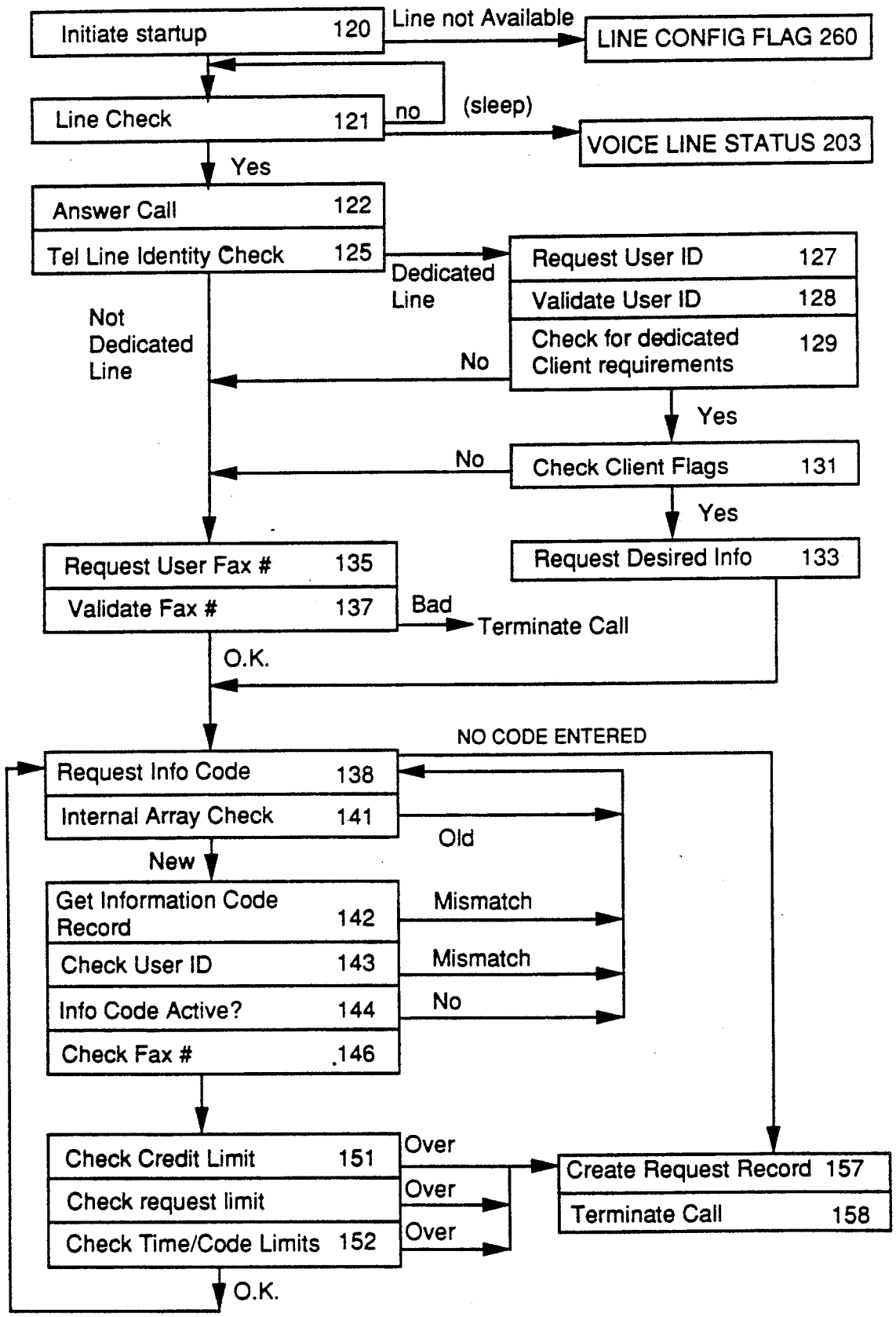
FIG. 4 is a flow diagram of the request controller tasks for the request reception module.

Referring next to FIG. 4, the operation of the Voice Line task 118 for one voice line will be described. The first thing the Voice Line task does when it starts up is to check whether the voice line 34 is properly configured (startup step 120). If it is not configured, a line configuration flag 260 is set indicating the line's inactive status and the task goes to sleep. Periodically, the system control software within the control and scheduling unit 14 will check the status of the voice line configuration flags 260 and inform the operator of any inactive lines which can then be set by the operator.

Assuming that the voice line is properly configured, the Voice Line task periodically performs a line check 121 to check for incoming calls on the telephone lines it monitors. Initially the line check 121 looks at a voice line status flag 203. If the voice line status flag 203 is "available" the Voice Line task continues to the main function. If the voice line status flag 203 is "not available", then the flag is reset to "available" and a change in status notice is sent to the operator. The line status flag may have several "not available" modes including a "shutdown" mode wherein the line cannot be used to answer incoming calls and a "restart" mode, wherein current operations of the Voice Line task are suspended, the buffers are cleared and a voice message is transmitted to any user on the line indicating that the system is temporarily down and inviting the user to call again.

In the embodiment illustrated in FIG. 3, the controller 30 monitors phone lines 40-43. When a telephone call is received (box 122 in FIG. 4) over, for example, line 40, the controller 30 looks for a line status flag 203 that is set to "available". Once an appropriate clear voice line is found, the line status flag 203 for the selected voice line is set to "busy" and the speech generator 36 is directed to generate an appropriate spoken greeting. If a halt status flag is set, the user is told to call back later and the call is then terminated.

The Voice Line task 118 in the request controller 30 then performs a telephone line identity check 125 to determine whether the call has been received over a telephone line dedicated to a particular client. There are two separate protocols depending on whether a call is received over a dedicated line or over a public line. If indeed the call is on a dedicated line, certain information, such as a user's fax telephone number, may be retrieved from the system files without requiring the user to enter such information.

When the incoming call is received over a dedicated customer line, the Voice Line task directs the speech generator unit to prompt the user to enter either a user ID or a fax telephone number (Request User ID 127). The user would then enter the appropriate User ID using the touch tone feature of the phone over which the call is being placed.

The system is designed to allow the clients to require the users to input certain additional information and to restrict the dissemination of its information to certain users. As such, there are several user verification steps which can be executed at this point to pre-screen the calls. Upon receiving the requested input, the Voice Line task checks a dedicated client file 106 to determine whether the client requires specific information prior to delivering the requested information (box 131). If so, the user is prompted to enter the desired information (box 133) in the same manner with the speech generator device issuing the appropriate voice prompts. For example, in the preferred embodiment, verification in the form of a User ID and/or a password may be required. Alternatively, the client may desire the users to enter a telephone number where they can be contacted, the priority of the request, etc. This check is accomplished by polling the flags 180-191 described above. For each flag that is activated, the Voice Line task executes a subroutine intended to solicit the desired information. Checks are provided in many of the subroutines to insure that the proper information is entered. If for any reason the user is unable to provide a suitable response (such as password) after a preset number of tries, the user will be so informed and the call terminated.

In the user identification example above, assume that the speech generator device 36 issues a voice prompt asking the user to input its identification (Request User ID 127). The user would then enter the appropriate user code number using the touch tone feature of the phone. Once the User ID has been received, the User ID is validated and the next dedicated client prompt is generated. The process continues until all of the client specific user information is received. If an invalid User ID is entered, the request User ID prompt is repeated for up do a designated maximum number of times.

To validate the User ID received (Validate User ID 128), the Voice Line task consults the client's user file 420 to determine whether the User ID provided is valid. In the event that an invalid User ID is received, an invalid number counter is incremented and the user is informed that an invalid User ID was received and invited to reenter an appropriate number. If for any reason the user is unable to provide valid User ID after a preset number of tries, a message is transmitted to the user informing the user of the problem and asking the user to contact a designated service number to investigate the problems with their User ID.

Once a valid User ID or fax number is received, the Voice Line task requests any other client specific information that is desired (as indicated by the information request flags in the client record 113) such as a user password, contact number, priority, etc. (box 133). However, each of these items is optional.

If the call is received over a public (non-dedicated) telephone line, the user is asked to enter a designated fax number to which the requested documents car be sent 135. The user is requested to enter the area code and/or country code before entering the local telephone number and an extension number, if applicable. When a single fax machine is used by a multiplicity of persons, such a single fax telephone number being used by a corporation, an extension number can be specified by the user so as to identify the person to which the requested documents are to be routed. The extension number is displayed on a cover sheet that is transmitted with the requested documents to facilitate delivery of the documents to the proper person.

Once the designated reception fax number has been received, a fax number will be transmitted back to the user if the system's echo flag is set. The user is then asked to accept the fax number or to re-enter the fax number. After the designated fax number has been entered and approved, it is validated 137.

The first stage of number validation is to check whether the number entered has the correct number of digits and whether the system permits calls to the area code designated in the request. If an improper number is entered, the user is requested to enter a new fax number. The second stage of validation is to determine whether the designated fax number is within the abused number file 101. A conventional search algorithm may be used to check the number. If the designated number is found within the abused number file, the call is treated as a crank call and the user is informed that an invalid fax number has been entered and the call is terminated.

After the user ID has been validated, if the call was received on a dedicated line, or after the designated fax number has been validated, if the call was received on a public telephone line, the next step is for the user to enter the information codes for the documents that the user wants to received. However, it is possible for a dedicated line to be used for delivering only a single document, in which case no code number needs to be entered. In that case, the call is terminated after the user's fax number or user ID has been validated, and then the document is delivered to the user.

Except in the case of a dedicated line used for just a single document, the user is prompted to enter an information code which designates the particular information sought 138. The user inputs an "*" instead of an information code to indicate that all of the desired codes have been requested. The entered code is initially checked against an internal array of input codes that have already been requested in this call (Internal array check 141). If the particular entered code has already been received, then a message is delivered to the user indicating that the selected code had already been requested. When the entered code has not been repeated, a Get code record operation 142 is performed which retrieves the information code record 108 associated with the requested code from the code information file 109. As indicated above, the information code record 108 contains several bits of information related to the information code which are pertinent to processing the information requested.

If no code record is found that corresponds to the entered information code, the user is informed that the entered code is invalid and the user is requested to enter a new code 138.

If a dedicated line is being used, the client can restrict the set of users authorized to receive a selected document. To do this, a check is performed to verify that the selected code is permitted for the specific user 143. If the user's ID does not match the set of allowed user IDs, the user is so informed and the Voice Line task requests the user to enter a new code 138. In addition, this step 143 checks that the selected code is a code that is owned by the client corresponding to the dedicated line on which the call is received.

Next, the information code is checked to determine whether it is currently active 144. There are three ways that a code become inactive: it can be deactivated by the client, the code may be temporarily inactivated while an operator is working on the code, or the code may have expired. To this end, the information code record 108 has a pair of activity flags 210, 211 and an expiration date 212 as shown in FIG. 9. Activity flag 210 indicates whether the code is generally available at this time. System action flag 211 indicates whether the information code is temporarily unavailable and the expiration date 212 indicates the last date on which the code can be transmitted. To test whether the code is active, the activity flags 210 and 211 are checked to make sure they do not read "unavailable". The current system date is then checked against the expiration date 212 in the information code record. If the expiration date precedes the current system date, or activity flag 210 reads "unavailable", a "bad code" message is delivered. The bad code message simply explains that the requested code number is not presently available and the user is requested to enter a new code 138. If activity flag 211 reads unavailable, a message indicating that the code is temporarily unavailable is delivered and the user is requested to enter a new code 138.

The client can also restrict the fax numbers to which specified documents may be disseminated. To check the user's specified fax number (step 146), the Voice Line task consults a restricted phone number file 103 to determine whether the designated fax number is either permitted or restricted by the client. If an inappropriate fax reception number is discovered, the user is so informed and the call terminated. It should be appreciated that the fax numbers can be restricted by code number, or for all documents belonging to the client, in addition the system level restriction of fax numbers in step 137. Thus, a client can vary the restrictions for each information code.

The system is arranged to permit great flexibility in regulating the users' access to the libraries documents. In general, each of the authorization flags and user access restrictions are repeated both at the client level and at the document code level. In addition, some types of authorization flags are found at the system level. Restrictions on user access are applied so that client level access restrictions take precedence over system level restrictions, and document code level restrictions take precedence over client level restrictions.

User access to specific documents may be regulated either by client ID or by specific information codes. That is, each of the authorization tests described above can be run for specific codes as well as for the client itself. As set forth above, these would include restricted fax number checks, User ID and/or password checks, calling area checks, repetition checks (limiting the number of times a particular document can be sent to a single fax number—often within a designated period of time), and the desired priority for the particular document requested. Appropriate flags in the information code record are polled to determine which (if any) specific inputs are desired. The appropriate subroutines for soliciting the desired information are then executed to properly prompt the user.

Once the availability of, and authorization for the desired information has been verified, a Credit limit check 151 is performed. The Credit limit check 151 first checks the total credit limit flag 438 in the client information record. If this flag is set, indicating that the client's credit limit has been exceeded, the user is informed that no further information codes are available at this time. If the overall credit status flag 438 is clear, then as long as the call is a local call, the request will be approved. If, on the other hand, the call is long distance, the Voice Line task will also check the long distance credit limit flag 439 in the client information record to determine whether long distance calls are permitted. If the long distance credit limit flag 439 is set, indicating that the client's telephone credit limit has been exceeded, the caller is informed that the entered code is not available at the current time. If either credit limit is exceeded and the call is received on a dedicated line, the call will be terminated (step 158) after generating a request record (step 157) because calls on dedicated lines pertain only to one client.

When a request has passed the credit limit test, all of the information necessary to transmit the requested information has been gathered. In order to prevent a single user from indefinitely tying up the request lines, the system has a limit to the number of information codes which may be requested at any one time. Therefore, after the credit limit tests have been performed, a maximum code check is performed wherein a code request counter is incremented and compared to a fixed limit 152. If the number of requested codes meets or exceeds the fixed limit, the user is so informed, the closing messages are spoken and the call terminated 158.

A clock is also provided to measure the length of an incoming call. Like the maximum code limit, the length of the incoming call is periodically measured against a maximum time period. If the maximum time period is exceeded, the user is so informed and asked to call again if the user wishes to order additional codes. If neither the maximum code limit nor the maximum time limit is met, then the Get code function 139 is executed and the verification loop is repeated for the next entered code.

The phone line will be periodically checked to determine whether the user has hung up. Such checks would typically occur after asking whether additional information is desired. Additionally, a clock is provided to monitor the time period between requesting information from the user and receiving the users inputs. If no response is received within a designated time limit, the phone line is checked to make sure it remains open and if so, the user is again prompted to provide the desired information. If an excessive delay, is recorded, the call would be terminated.

When the call is to be terminated after receiving legitimate information code requests, a request record is created (Create request record 157) and a closing message is generated before the call is actually terminated (Terminate call 158). The closing message informs the user that its request has been processed. After the call has been terminated, the voice line status flag 203 is set to "available" and the entire process repeated for the next phone call.

The request record 90 is compiled by the Voice Line task 118 from an internal request array which indicates each of the codes entered together with the solicited responses. The request record 90 is stored in a voice request file 430 when the call is terminated. At least one separate request record is provided for each client. In the event documents requested from a single client have been assigned different priorities, separate request records are provided for the varying priority levels.

The request record 90 is designed to provide all of the information necessary for transmitting the requested information, billing the appropriate parties and providing any desired documentation. Each request record designates all of the codes (i.e., documents) requested by a user from a single client having the same priority. Thus, if the user requests different priority for different documents or if documents are requested from multiple clients, multiple request records will be created. When formulating the request record, the current system date and time are read from the request controller's clock and placed in the request record. Once the request record is completed, it is transferred to the scheduling module 14 over local area network 19. Once the transfer has been completed and verified, the request record 90 within the request module is deleted.

Referring next to FIG. 9, in the illustrated embodiment of the invention, the request record 90 forms a string including: the client ID 170; the current system date 500; the designated fax number 502; ar indication of the number of codes in this request record 504; the actual code numbers 505; the type of long distance call 507 (i.e., international, outside area code, within the area code), the record's designated priority 509, and the date and time when the request was received 510. A table is also provided for each code indicating the number of pages 520 in the code 110, and the estimated delivery duration 526. A request type flag 530 indicates the type of input device which received the order (i.e., voice unit, dial-in unit, etc.). Other information within the completed request record includes a unit identification field 532 that indicates the unit number that processed the incoming request; a user confirmation number 534 that provides the contact telephone number of user; and a delivery retry counter 536 which indicates the number of times a delivery has been attempted for this code. The delivery retry counter field is not necessary in the request record and is only provided to allow the order record 301 kept by the scheduling unit to identically match the request record 90. Although the request record 90 is created within the request controller 30 in the preferred embodiment, it should be appreciated that once the original information has been received from the user, the details related to the delivery of specific codes could readily be compiled in another controllers such as the scheduling controller or in a dedicated processing unit.

A Voice Request task 119 is provided to compile the request records. The Voice Request task is also executed by the request controller 30, but unlike the Voice Line tasks 118, only a single Voice Request task is provided for each request module 10. The Voice Request task reads through the voice request file 430 looking for unprocessed internal request arrays and records having newly entered codes. When a newly inputted code is found, the Voice Request task estimates the charges associated with delivery each code (i.e., document) and checks the clients credit to determine whether the client has sufficient credit to cover the costs of transmitting the code. If so, the estimated charges are subtracted from the client's credit limit.

Additionally, after an entire order has been received, the Voice Request task completes the request record 90. Once the request record is completed, the it is written to the scheduling module's system request file 300, where it becomes a complete order record 301.

As explained above, there are two types of charges that are associated with transmitting documents. The first is a delivery fee which constitutes the price for delivering a particular document to a user, and the second is long distance telephone connection charges. The client information record for each client contains four fields: an accumulated telephone charges field equal to the total telephone charges accumlated since the last billing cycle, an accumulated total charges field equal to the total charges accumlated since the last billing cycle, a telephone credit limit field and a total credit limit field. If the accumulated telephone charges exceed the telephone credit limit or the total charges exceed the total credit limit, the client's credit flag is set, and no further requests for that client's documents are accepted.

The Voice Line task only checks the client's credit flag to make sure that the client corresponding to requested documents has not overrun his credit limit. If the credit limit flag is not sent, then the requested document will be delivered, even if the charges associated with delivering the document exceed the cleint's credit limit.

The Voice Request task computes estimated telephone and total charges for delivering each requested document. The delivery fee is determined by looking up the appropriate charge in the Delivery Charge file 105. The long distance charges are estimated by looking up the size of the requested document in the information code record 108, calculating an estimated delivery time based on the size of the document, and then calculating the estimated long distance charges using the long distance rates table 104 and the estimated delivery time. The estimated long distance charges are added to the current accumulated telephone charges (without modifying the accumlated telephone charges field) and compared with the telephone charge credit limit stored in the client information record. Similarly, the estimated total charges are added to the current accumulated total charges (without modifying the accumlated total charges field) and compared with the credit limit 436 stored in the client information record. If either credit limit is exceeded by the estimated charges, then the client's credit flag 438 is sent, preventing the delivery of any additional documents belonging to the client.

If additional codes are requested after either of the client's credit limits has been exceeded, the user is informed that no further codes are available from this client.

The Fax Processing Task 255 denotes the actual length of the telephone connection required to deliver the requested documents. Finally, the Monitor Delivery Task 340 in the schedule module computes the actual telephone and total charges associated with delivery of the requested documents and adds these amounts to the accumulated telephone and total charge fields in the client information record.

An alternative request reception module is a dial-in unit which generates and receives digital prompts suitable for use by remote computer terminals. The dial-in unit may function identically with the previously described voice unit except to the extent that digital prompts are generated in place of the voice prompts described. However, the dial-in units have the capacity to allow the user a wider range of services, including keyword searches for particular document and listings of the documents available from specific clients.

A code scan function allows the user to enter a designated character (such as a question mark) in place of an information code when the enter next code prompt is displayed. When the user enters the designated character, the system prompts the user to request either a listing of information codes for a particular client (an organization scan), or to request a keyword search. If the organization scan is chosen, the user is prompted to enter the client number. Once the user enters the appropriate number, all of that clients information codes will be displayed by information code number and title. If the user enters an inactive or otherwise invalid client number, a prompt is generated indicating that an invalid number was entered and the user is asked to enter another client number. In the event that the user does not know the appropriate client number, it may enter another designated character to receive a listing of all of the system's clients.

The clients have the option of requiring the users to enter a password in order to view its list of codes. A password flag 181 in the client record 113 indicates the need for entering such a password. The suitable password is stored in a password field 192 in the client record. If the password flag 181 is set to require the use of a password, the request controller 30 issues a password prompt and the entered password is compared to the word stored in the password field 192. As before, when an incorrect password is received, the user is so informed and given another chance to enter the appropriate password. Similarly, the client has the option of requiring further identification to perform these searches and validation is done identically to the validations described above with respect to aspects of the voice unit.

The keyword search function allows the user to enter keywords and perform a search of the various information code keyword fields 193 for codes having the selected keyword(s). The system is arranged to allow the user to perform searches either by client or throughout the entire system. Once the user inputs a keyword and executes the search, the keyword fields of all of the information code records belonging to the designated client are searched for a match. All matches are listed by code number and title. Like the organization scans described above, a wide variety of user validation schemes can be used to regulate those permitted to use each client's keyword search functions.

In one embodiment of the invention, the request reception modules 10 have an update mode that allows the clients to remotely make changes to certain fields in the records of their information codes, such as activating or deactivating a code or to change its expiration date. Additionally, the client is permitted to add, change or delete records in the client's user file and or its codes user files. Further, the client can remotely scan in a new document using the client's fax machine.

To make the desired changes, the user calls one of the numbers on the request module's PBX and is connected with a voice line 34 in the usual manner. After receiving the standard welcome message, the client enters a special unprompted signal (such as a predefined sequence of two or three touch tones). Upon receiving the change code signal, a message is generated asking the user for its client code. If the client code is valid, the client is asked which table (i.e., file) it wishes to change. A check is then made to insure that the table indicated is available for remote change by this client (as indicated by a series of flags in the client record 113). A prompt is then generated asking the client to enter the appropriate password. The input received is compared against a code change password in the client record. If during any of the steps listed above, the client enters an inappropriate response, the request controller 30 issues an explanatory message and requests that the client repeat the input. In each case, there is a preset maximum number of tries which are permitted before the call is terminated.

Once the client has indicated the table he wishes to alter, a sequence of prompts are generated to step the client throught the process of changing the selected table. By way of example, if the client indicates that he wishes to change document access code information, a prompt is generated asking the client to enter the information code to be altered. The current status of each of the fields subject to change is then prompted and the client is asked whether he desires to change the field indicated. If so, the client is prompted to enter the desired entry. If, during the course of the call, the client has entered all of the information he wants changed, he enters the end of request character and a goodbye message is spoken before the call is disconnected. The line status is then set to "available" to answer another call. Changes to other files are accomplished in the same manner as changes to the information code record.

FAX DELIVERY MODULE

Figure 5:
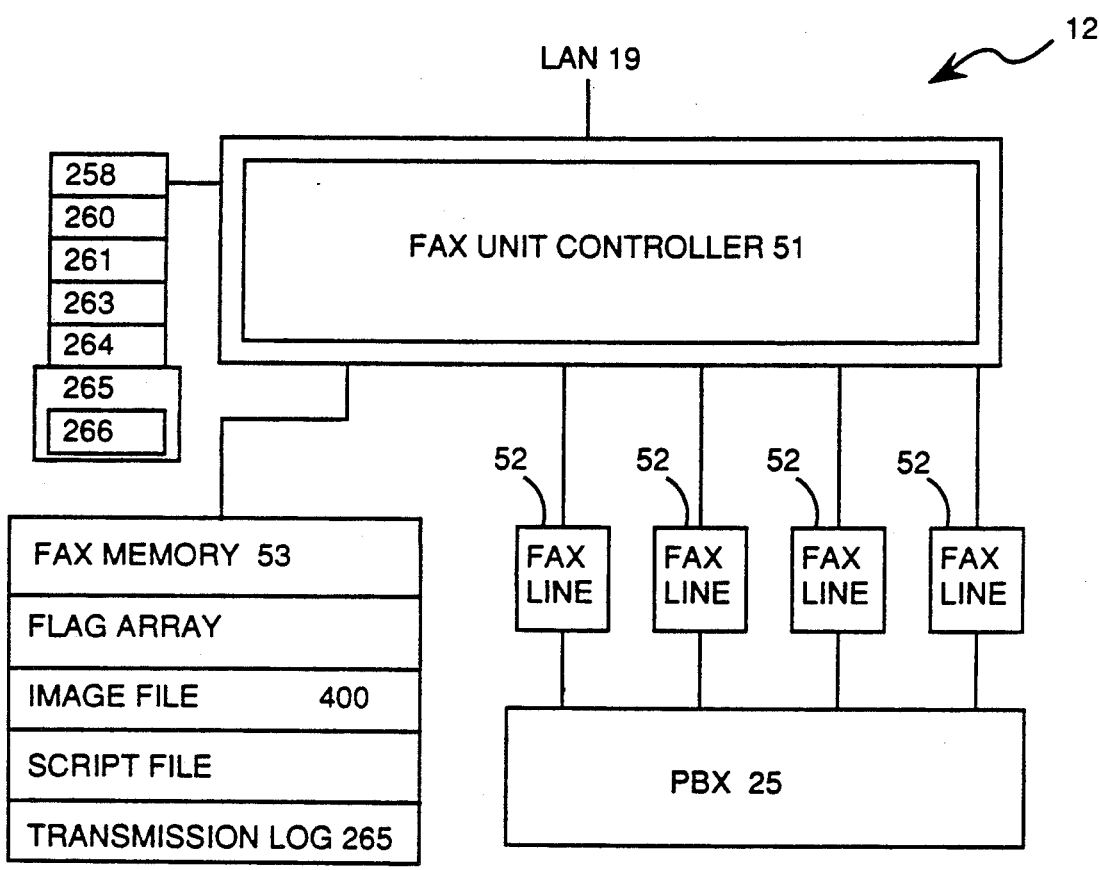
FIG. 5 is a block diagram of a fax delivery module in accordance with the present invention.

Referring to FIG. 5, the fax delivery module 12 is arranged to deliver the digitally stored images requested by the various users of the system to the user's conventional fax machines. Each fax delivery module 12 includes a fax unit controller 51 that directs a plurality of fax lines 52 capable of transmitting digital image information in conventional fax formats. Each fax delivery module 12 has a corresponding Fax Status task within the controller software which monitors the status of the various fax lines at predetermined intervals. After startup, the Fax Status task checks each of its associated fax lines 52 to insure that they are properly configured. If one of the lines is not configured, a message is sent to the operator console and the line configuration flag 260 is set to "unavailable". If the line is properly configured, the line configuration flag is set to "available". The Fax Status task then gets the current system date and time from the system parameter record in the scheduling module and goes to sleep.

Figure 6:
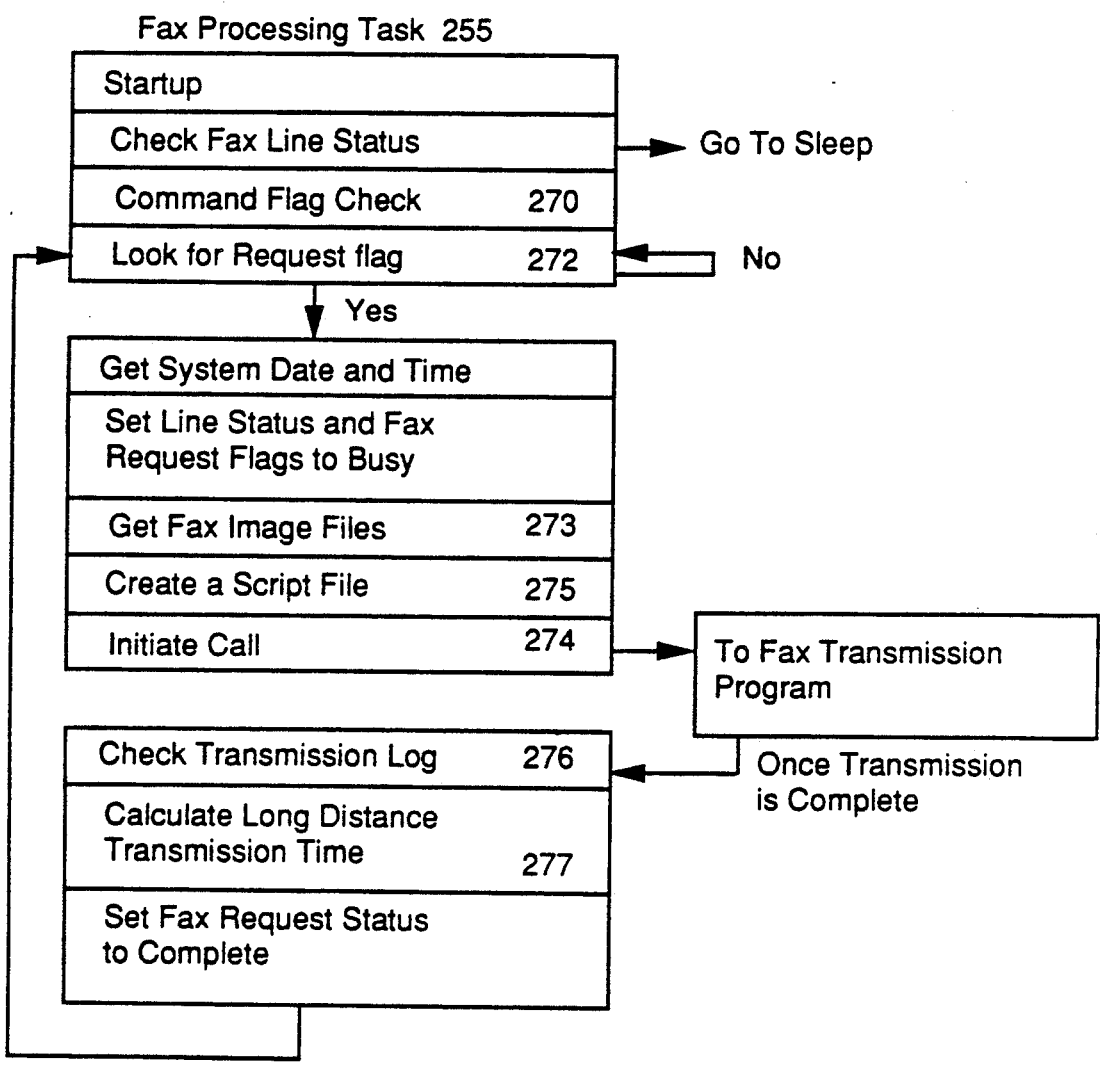
FIG. 6 is a flow diagram of the fax controller tasks for an embodiment of the fax delivery module.

Referring to FIG. 6, the Fax Processing task 255 is responsible for actually directing the delivery of the documents requested by the user. During startup, the Fax Processing task checks the line configuration flag 260 for its associated fax lines 52. If all the configuration flags read "unavailable," the task goes to sleep. Initially, the Fax Processing task 255 checks a command status flag 258 (Command flag check 270) to determine what mode the fax module is in. If the command flag is set to go, a fax line status flag 261 corresponding to the task's associated fax line is checked and set to "available". If the command status flag 258 is set to something other than go (such as halt, restart or shutdown), the appropriate procedures are executed.

Assuming the command flag 258 is set to go and the line status flag 261 is properly set, the Fax Processing task interrogates a request flag 263 which indicates when an order record is ready for delivery to the fax module (Look for request flag 272). If no requests are ready for delivery, the task goes to sleep and periodically rechecks the status of the request flag 263. Once a "ready" signal is found on the request flag 263, the system time and date are taken from the fax module's controller and placed in the delivery date field 264 of the order record. The request flag 263 is then set to "processing" and the fax line status flag 261 is set to "busy".

To deliver the requested documents, a transmission request is issued to the fax line. The Fax Processing task then generates a temporary copy of the image files for the requested documents in a temporary storage area, typically on a hard disk in the fax module (Get fax image files 273). Once the temporary copy of the image files 400 are installed in the fax module, a script file is created to indicate where the image files are to be sent (Create script file 275). A call is then initiated 274, and the requested files are delivered to the user's designated number using a conventional fax software program.

The Fax Processing task 255 periodically analyzes the transmission log 265 created by the convention fax software program to determine whether any previously posted requests have been completed. The transmission log 265 contains a count of the number of pages successfully delivered. The Fax Processing task determines the error status of each code and page (step 276). If each page was successfully sent, then a "fax sent" status flag within the order record 301 is set to "yes". If, on the other hand, an error code occurred, the status flag is set to "no". If an error occurred during the delivery of any of the requested documents, then an error flag would be set indicating the occurrence of an error.

For each code whose pages were all successfully delivered, the Fax Processing task calculates the delivery time (i.e., the long distance telephone connection time (step 277).

Once the above steps have been completed, the delivery status flag 313 for the selected fax line is set to "completed" and the Fax Processing task returns to the "Look for request ready flag" step 272.

SCHEDULING MODULE

The scheduling module 14 has several functions including: storing a System request file 300 that maintains all of the order records 301 received from the request module 10 that have not been delivered to the users; storing a Code delivery audit file 304 that maintains an audit record 305 for each request that has been delivered; determining the order in which the various information requests will be delivered: and providing the operator with access to the software tasks that control the various modules. These functions are accomplished through the operation of a variety of relatively independent software tasks.

A System Configuration task (not shown) is provided to ensure that the system is properly configured before any activity will occur on the fax distribution system. The System Configuration task includes subtasks which specifically check to insure that the configurations defined by each of the modules are compatible to the other modules within the system.

A System Start/Restart task (not shown) is provided which is performed each time the system is powered up or when the operator requests a restart. The System Start/Restart task communicates with each of the active modules to insure that they are properly powered up before activity begins as well.

Referring to FIG. 7A, a Line Monitor task 325 periodically checks the status of all the fax and voice lines to determine their availability. Initially, the line monitor task checks to make sure that the various fax lines are still properly configured. It then checks for configured lines that are not actively processing a fax delivery. Available fax lines are then identified in a link list 310. The availability checks are accomplished by polling the various line configuration flags 260 and fax line status flags 261 set by the Fax Processing tasks 255 executed by the various fax module controllers.

One of the principle tasks of the scheduling module 14 is to arrange the order in which the various user information requests are delivered. Referring to FIG. 7B, the scheduling function is orchestrated by a Post Request task 328. The Post Request task 328 monitors the system request file 300 for order records 301 that are ready for delivery and then matches the order records with available fax lines for delivery. Once an order record 301 is transferred to a fax delivery module 12 for transmission, it is deleted from the system request file 300.

After startup, the Post Request task interrogates the system request file 300 for the next available order record 301 (Find order record 330). The actual routine used to prioritize the requests may be widely varied. However, in the embodiment chosen for illustrative purposes, the routine searches through the entire system request file 300 for the oldest order record having the highest pending priority. This document is then selected to be the next delivered record. If no records are found, then the post request task goes to sleep for a designated period of time.

Assuming that an order record is found, a "find open fax line" check 332 is performed to locate an idle fax line. This is accomplished by reading the link list 310 created by the Line Monitor task 325 discussed above. If no fax lines are available, the Post Request task 328 remains inactive until informed by the Line Monitor task 325 that one of the fax lines is available. Once a line is found, the order record is transferred to the fax delivery module and the record is deleted from the System Request file 300 (Transfer order file 334). The Post Request task 328 then returns to the "find order record" step 330 and looks for the next order to be delivered. The Post Request task is periodically executed the entire time the fax delivery system is operational.

As set forth above, in the preferred embodiment, the order records contain all of the information contained in the request record. However, such an arrangement is not necessary and it is specifically noted that when transferring order records between the scheduling module and the fax modules, it is not necessary to transmit all of the information carried by the order records of the scheduling module. However, each order record delivered to the fax module includes, inter alia, fields containing an identification number, a delivery priority flag, a request date, the actual transmission duration, the designated fax number, the delivery date, the retry history and an identification of the type of long distance contemplated. It also contains a table including an array of information codes to be delivered, the number of pages in each code, and the actual page numbers to be delivered with each code.

Referring next to FIG. 8, the Monitor Delivery task 340 will be described. The Monitor Delivery task is executed periodically to check the fax lines looking for an order delivery that has been completed. When a completed delivery is found, the Monitor Delivery task creates an audit record 305 for each information code that was successfully sent.

During startup, the system configuration flag is checked to determine whether the various modules are configured and operational. Once the system is configured, the monitor delivery task 340 reads through the fax line file 312 looking for a completed delivery status flag 313 indicating that a particular one of the fax lines 52 has completed an order delivery (Check completed delivery flags 342). It will be appreciated that there are three delivery conditions that can exist for a fax line with a completed status. The usual and preferred result is that all of the requested information was successfully delivered. If however, problems occurred during transmission, only some of the requested documents might have been delivered. Finally, it is possible that none of the requested documents were actually transmitted. Therefore, when a completed delivery is found, the fax error flag 314 corresponding to the completed delivery is checked to determine whether the delivery was successful (Check line error flag 344) or not. Unsuccessful delivery can be due to a variety of conditions, including "busy line", "out of paper", "voice answer", and so forth.

For each document successfully delivered (see step 350), the Monitor Delivery task creates an Audit record 305 for the delivered information (step 352). As seen in FIG. 9, the Audit record 305 includes indications of: the information code transferred 110; the client ID number 170; the actual delivery time and date 540; the actual duration of the transmission phone call 541; the calculated long distance charges 542; the delivery charge for the delivered code (apart from long distance charges) 544; the designated fax number 502; the initially designated priority 509; the date and time the request was made 510; the actual priority of the request when delivered 548; the type of request received 530; the retry counter 549; and a flag indicating whether the audit record has been written to the billing file 550.

Audit records are actually created for two different circumstances. First, a record is created for each code that is successfully delivered. Second, a record is created for each code which encountered errors in transmission the designated maximum number of times permitted. An audit record 305 is created in the code delivery audit file 304 for each unsuccessful delivery attempt that incurs long distance charges, in order to show a detailed record of all long distance charges incurred for a particular client.

Once each of the information codes has been checked (steps 350 and 352), the Monitor Delivery task processes the delivery errors. Initially, the error retry history is incremented and compared with a designated maximum (Check retry counter 354). If the maximum number of retries has been attempted, then a maximum try flag 331 is set in the order record and a high priority message is sent to the operator console indicating the inability to transmit the order (step 356). The maximum try flag 331 is checked by the Post Request task when selecting the next order to be transmitted and no further attempts will be made to transmit the requested information while the maximum try flag 331 is set. Until the maximum allowed number of attempts have been made, the information codes whose documents were not successfully delivered are assembled into a secondary order record and transferred back to the system request file 300 (step 358). If the maximum number of attempts have been made, an audit record is created from the remaining undelivered codes.

A Priority Monitor task (not shown) keeps track of the requests in the System Request file 300 to look for old orders. If a request is found whose desired delivery date and time are earlier than the current system date or are otherwise overdue by more than an identified acceptable margin, then that request's priority will be upgraded to the next highest priority.

A Snapshot task becomes active at predetermined intervals to check the status of the various lines and the system request file. This information is placed into a snapshot file which may be accessed by the operator to monitor the operation of the system.

Messages are sent to the operator console by most of the tasks in the system. Some of these messages are low priority, while others are very important and require the operator's attention. Each message is assigned a priority level before it is sent. All messages are stored in a Console message log file and can be viewed at any time by the operator until they are purged. All messages that are above a designated priority break into any screen that the operator is using by displaying on a message window at the bottom of the screen.

BILLING AND IMAGE CREATION MODULE

The billing and image creation module is arranged to both create the image files to be used by the system and to automatically bill the clients. An Image Creation task uses a conventional scanning device to scan an image and enter a digital representation of the image into an appropriate image file 400. Documents can be stored in either fax "TIF" format or in "Paintbrush" format, which allows images to be edited. When a new page is entered into the system, the next available page number is retrieved from the system parameter record as the new page number. The next available page number counter is then incremented by "1". The operator is then prompted to enter information pertinent to the page including both long and short descriptions, a few keywords, the origin of the page, and the length of the page. With this information, a page information file is created for the page number.

When all of the pages of a particular information code are entered, a Code Creation task is provided to facilitate the creation of an information record 108. The Code Creation task prompts the operator to input the necessary information to create the code information record 113.

A Delete Page task is provided to allow the operator to readily delete an image record from the image file as well as its associated page record from the page information file.

Billing functions are also automatically accomplished by the billing module. Information from the audit records 305 and the client records 113 are used to create bills for each client on a regular basis. The bills may either be printed on paper or placed in a fax image file. The client record is also updated to reflect payments, adjustment, deposits or the like made by the clients. Thus, when a new deposit or payment is received, the client credit limit field 436 in the client's record 113 is updated to reflect the change in balance for the client's account.

ALTERNATE EMBODIMENTS

Although only one embodiment of the present invention has been described in detail herein, it should be understood that the present invention may be embodied in many other specific forms without departing from the spirit or scope of the invention. Particularly, it should be appreciated that the voice prompting and dial-in systems are interchangeable and it should not matter to the system how the requests are entered. Further, although the system was described in terms of a central library that stores messages for a number of clients, the system could readily be arranged to accommodate the needs of a single organization such as a large corporation or a governmental department wherein the available information is provided as a free service thereby eliminating the need for extensive billing information. Alternatively, the system could be arranged such that the users are billed directly as opposed to the information providers.

It should also be appreciated that the various user identification checks set forth above are by way of example only and that the system may be configured to ask for any information desired by the clients, including billing information.

Furthermore, while the preferred embodiment uses several personal computers coupled by a local area network, the present invention could be easily implemented on a single computer with several software modules. Also, if other document and image transmission technologies become available, the "fax delivery modules" would become "document image delivery modules". For the purposes of the present invention, it does not matter what type of image delivery technology is used. Furthermore, an alternate embodiment may use a distributed library of documents and/or distributed fax and request modules at a number of interconnected locations.

Therefore, the present examples and embodiments are to be considered as illustrative and not restrictive, and the invention is not to be limited to the details given herein, but may be modified within the scope of the appended claims.

What is claimed is:

1. A document delivery system for delivering recorded documents from an information storage location to specified user facsimile machines positioned at remote locations, the information delivery system comprising:

memory means for storing a multiplicity of documents;

request processing means for receiving requests for specific documents stored within said memory means, said request processing means including prompting means for providing signals to a user to prompt the user to specify order information denoting one or more selected documents and a designated telephone number for the user's facsimile machine; said prompting means including, a plurality of voice lines each capable of connecting the request processing means to a user on an incoming telephone line, each said voice line having an associated speech generator for generating voice messages prompting a user to provide order information, and a request controller coupled to said voice generator means and said voice lines for directing the generation and delivery of voice messages to said voice lines to prompt the users to provide order information, to echo back to said users said order information, and to prompt users to correct said order information when said order information is erroneous; said request processing means including means for assigning each document request a priority value;

facsimile delivery means for automatically delivering selected documents to a facsimile machine at said designated telephone number, said facsimile delivery means including at least one facsimile delivery module having:

a plurality of independent facsimile lines each capable of transmitting selected documents to a remote facsimile machine, said facsimile lines being capable of simultaneously delivering independent documents to different remote facsimile machines; and facsimile control means for receiving the order information and for directing a particular facsimile line to deliver the selected documents to the designated telephone number, wherein said facsimile control means includes means for receiving order information for a plurality of independent orders and for coordinating the simultaneous delivery of selected documents to different designated numbers; and control means, coupled to said request processing means and said plurality of facsimile delivery means, for restricting and restraining access by said users to said documents stored in said memory means in accordance with specified criteria, and for scheduling and controlling delivery of requested documents via said facsimile delivery means in accordance with priority values assigned to said document requests.

2. An information delivery system as recited in claim 1 said control means including an abused number file indicating one or more telephone numbers to which information transfers are prohibited, wherein said request processing means includes means for comparing said designated telephone number with said telephone numbers in said abused number file and for preventing the delivery of said selected documents by said facsimile delivery means when said designated telephone number is found in said abused number file.

3. A method of delivering selected documents from a storage location to facsimile machines at remote location, the selected documents being delivered in response to telephone requests, the method comprising the steps of:

storing a multiplicity of documents;

storing a plurality of client information records each corresponding to a group of said stored documents, each said client information record denoting protocols required for a caller to access said group of stored documents, each said stored document having an associated client information record;

receiving an incoming telephone call from a remote caller;

automatically prompting the caller to provide order information denoting selected ones of said stored documents and a designated telephone number of a facsimile machine for receiving the selected documents;

initiating a telephone call to the designated number; and transmitting the selected documents to a facsimile machine at the designated telephone number;

said method including accessing the client information record corresponding to each said selected document and executing the protocols denoted in said client information record.

4. An information delivery system for delivering recorded information from an information storage location to a user's facsimile machine positioned at a remote location, the information delivery system comprising:

memory means for storing a multiplicity of documents;

request processing means for receiving requests for specific documents stored within said memory means, the request processing means including prompting means for providing signals to a user to prompt the user to specify order information denoting one or more selected documents and a designated telephone number for the user's facsimile machine;

facsimile delivery means, coupled to said request processing means and said memory means, for automatically delivery selected documents to a facsimile machine at said designated telephone number; and a plurality of client information records each corresponding to a group of said stored documents, each said client information record denoting protocols required for a user to access said group of stored documents, each said stored document having an associated client information record;

wherein said request processing means includes means for accessing the client information record corresponding to each said selected document and for executing the protocols denoted in said client information record.

5. An information delivery system as recited in claim 4 wherein said request processing means includes means, coupled to said memory means, for reeeiving documents to be stored in said memory means, and means for replacing a specified document stored in said memory means with a received document; each said client information record denoting protocols required for replacing documents with said corresponding group of stored documents.

6. An information delivery system as recited in claim 4, each said client record denoting whether said system should limit deliveries to any one designated phone number from said corresponding group of documents to a specified maximum number of documents.

7. An information delivery system as recited in claim 4 wherein said protocols denoted in said client information records includes requesting the user to enter a password.

8. An information delivery system as recited in claim 7 wherein said protocols denoted in said client information records determine whether delivery of each selected document is permitted.

9. An information delivery system as recited in claim 7 further comprising a multiplicity of information code records, each corresponding to a particular one of the documents, each said information code record denoting protocols required for users to access said corresponding document;

wherein said request processing means includes means for accessing the information code record corresponding to each said selected document and for executing the protocols denoted in said information code records.

10. An information delivery system as recited in claim 4, said request processing means including one or more dedicated request channels with means for automatically assigning every document request received via a dedicated request channel a corresponding designated telephone number for document delivery;

whereby frequent users of said system can be assigned dedicated request channels, eliminating the need for such frequent users to specify the telephone number for the user's facsimile machine.

11. An information delivery system for delivering recorded documents from an information storage location to specified user facsimile machines positioned at remote locations, the information delivery system comprising:

memory means for storing a multiplicity of documents;

request processing means for receiving requests for specific documents stored within said memory means, said request processing means including prompting means for providing signals to a user to prompt the user to specify order information denoting one or more selected documents and a designated telephone number for the user's facsimile machine; said prompting means including, a plurality of voice liens each capable of connecting the request processing means to a user on an incoming telephone line, each said voice line having an associated speech generator for generating voice messages prompting a user to provide order information, and a request controller coupled to said voice generator means and said voice liens for directing the generation and delivery of voiced messages to said voice lines to prompt the users to provide order information;

facsimile delivery means for automatically delivering selected documents to a facsimile machine at said designated telephone number, said facsimile delivery means including at least one facsimile delivery module having:

a plurality of independent facsimile liens each capable of transmitting selected documents to a remote facsimile machine, said facsimile lines being capable of simultaneously delivering independent documents to different remote facsimile machines; and facsimile control means for receiving the order information from said request processing means and for directing a particular facsimile line to deliver the selected documents to the designated telephone number, wherein aid facsimile control means includes means for receiving order information for a plurality of independent orders and for coordinating the simultaneous delivery of selected documents to different designated numbers;

scheduling means for determining the order of delivery of received orders, including means for receiving order information from said request processing means and for creating an order file denoting the order in which selected documents are to be transmitted to facsimile machines at corresponding designated telephone number; and a plurality of client information records each corresponding to a group of said stored documents, each said client information record denoting protocols required for users to access said group of stored documents, each said stored document having an associated client information record;

wherein said request processing means includes means for accessing the client information record corresponding to each said selected document and for executing the protocols denoted in said client information record.

12. An information delivery system as recited in claim 11 further comprising a multiplicity of information code records, each corresponding to a particular one of the documents, each said information code record denoting protocols required for users to access said corresponding document;

wherein said request processing means includes means for accessing the information code record corresponding to each said selected document and for executing the protocols denoted in said information code records.

13. An information delivery system as recited in claim 12 wherein said protocols denoted in said client information records and information code records include:
requesting the user to enter a password;
requesting the user to enter an identification number; and
determining whether delivery of the selected document to the designated telephone number is permitted.

14. An information delivery system as recited in claim 13 wherein the system includes means for detecting when said facsimile delivery means fails to successfully transmit a document and for automatically retransmitting those documents which were not successfully transmitted.

15. An information delivery system as recited in claim 14 wherein touch tone phone signals are used to specify information to the request module.

16. An information delivery system as recited in claim 11 wherein said request processing means includes means, coupled to said memory means, for receiving documents to be stored in said memory means, and means for replacing a specified document stored in said memory means with a received document; each said client information record denoting protocols required for replacing documents with said corresponding group of stored documents.

17. A method of delivering selected documents from a storage location to facsimile machines at remote locations, the selected documents being delivered in response to telephone requests, the method comprising the steps of:
storing a multiplicity of documents;
receiving an incoming telephone call from a remote caller;
automatically prompting the caller to provide order information denoting selected ones of said stored documents and a designated telephone number of a facsimile machine for receiving the selected documents; echoing back to said caller said order information, and prompting said caller to correct said order information when said order information is erroneous;
restricting and restraining access by said callers to said stored documents in accordance with specified criteria;
assigning each selected document a priority value;
scheduling delivery of said selected documents in accordance with priority values assigned to selected documents;
initiating a telephone call to a designated telephone number corresponding to one or more of said selected documents in accordance with said delivery schedule; and
transmitting the selected documents to a facsimile machine at the designated telephone number.

18. A method as recited in claim 17 said restricting step including the steps of storing an abused number file indicating one or more telephone numbers to which information transfers are prohibited, comparing said designated telephone number with said telephone numbers in said abused number file, and preventing the delivery of said selected documents by said facsimile delivery means when said designated telephone number is found in said abused number file.

19. A method as recited in claim 17 further comprising the steps of storing a multiplicity of information code records, each corresponding to a particular one of said stored documents, each said information code record denoting protocols required for callers to access said corresponding document; and
accessing the information code record corresponding to each said selected document and executing the protocols denoted in said information code records.

20. A method as recited in claim 17 further comprising the step of recording monetary charges associated with the delivery of said selected documents.

21. A method as recited in claim 17 further comprising the steps of detecting when said transmitting step fails, and automatically rescheduling delivery of selected documents for which said transmitting step failed.

22. A method as recited in claim 17 further comprising the steps of storing a multiplicity of information code records, each corresponding to a particular one of said stored documents, each said information code record assigning a default priority value to said corresponding document and denoting whether a user can specify a higher priority value to a request for said corresponding document;
said prompting step including prompting users to specify a priority value for a selected document whenever said corresponding information code record denotes that such a specification is allowed.

23. A method as recited in claim 17, said receiving step including receiving telephone calls on one or more dedicated request channels;

said prompting step including automatically assigning to order information received via a dedicated request channel a corresponding designated telephone number for document delivery;

whereby frequent users of said system can be assigned dedicated request channels, eliminating the need for such frequent users to specify the telephone number for the user's facsimile machine.

24. A method as recited in claim 17 said restricting step including determining whether delivering documents to the designated telephone number is permitted, wherein if delivering information to the designated number is not permitted, the selected documents will not be delivered.

* * * * *